March 13, 1962 V. P. MAGNUSON 3,024,990
PHYSICAL DISPLACEMENT REGISTER
Filed June 6, 1958

INVENTOR.
VERNON P. MAGNUSON
BY Byard G. Nilsson

United States Patent Office 3,024,990
Patented Mar. 13, 1962

3,024,990
PHYSICAL DISPLACEMENT REGISTER
Vernon P. Magnuson, Gardena, Calif., assignor to The Bendix Corporation, a corporation of Delaware
Filed June 6, 1958, Ser. No. 740,500
5 Claims. (Cl. 235—154)

The present invention relates to a physical displacement digitizer and more particularly to means for providing digital signals indicative of the physical displacement of a shaft or other member.

In automatic-control systems, and computers, digital signals are commonly employed to represent numerical information and other data. In many applications of data-handling equipment, it is desirable to provide digital signals which are indicative of physical displacement, as the rotational displacement of a shaft. To provide such digital signals, various systems have been proposed; however, in general, there remains a need for a physical displacement digitizer which provides digital signals indicative of physical displacement and the directions of such displacement, and which is unaffected by vibratory movement of the member, and which is inexpensive to manufacture.

The present invention provides a physical displacement digitizer wherein two two-state signals are formed with displacement of the member under observation. These two two-state signals are then applied to a logic system including means for registering past states of one of the signals, and means for controlling the individual utilization of one of the two-state signals, to thereby form digital signals representative of displacement of the member under observation and the direction of such displacement.

Various objects and advantages of the present invention will become apparent from the following detailed description when taken in conjunction with the attended drawings wherein.

Figure 1:
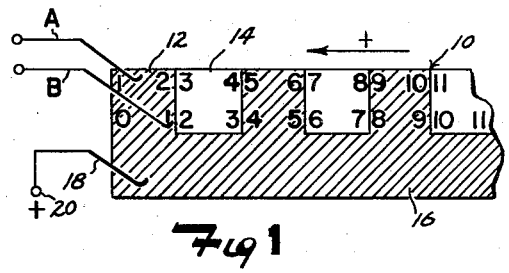
FIGURE 1 is a diagram utilized to illustrate the mode of operation of a system constructed in accordance with the present invention.

Referring first to FIGURE 1, there is shown a segmented section 10 which includes alternately-arranged conductive segments 12 and non-conductive segments 14. The conductive segments 12 are electrically interconnected by a conductive strip 16. The segmented section 10 is adapted to be mounted upon the member of which physical displacement is to be digitized. Of course, the segmented section may be formed upon a circular area which is mounted upon a shaft or may be formed angularly into a cylinder which is attached to a shaft.

The conductive segments 12 in the segmented section 10 receive a direct volatge through a brush 18 from a terminal 20 which is adapted to be connected to a source of voltage. Also positioned to contact the segmented section 10 are brushes A and B which are mounted offset from each other by approximately one-half a segment width and therefore upon movement of the section 10 relative to the brushes receive two-state signals which are offset in phase.

To illustrate, in a preliminary manner, the operation of a system incorporating the present invention, FIGURE 1 will now be considered with reference to the chart set out below.

| Change Incurred (Arbitrary) | Brush Observed | Result |
| --- | --- | --- |
| 1-2 | B | Plus. |
| 2-3 | A | Plus. |
| 3-2 | B | Zero. |
| 2-3 | B | Zero. |
| 3-4 | B | Plus. |
| 4-3 | A | Zero. |
| 3-2 | A | Minus. |
| 2-1 | B | Minus. |

Referring to FIGURE 1, it is to be noted that duplicate numbers 1 through 11 are shown positioned upon the different segments 12 and 14. The upper numbers (those in alignment with brush A) indicate various positions for the brush A, while the lower numerals (those in alignment with brush B) indicate various positions of the brush B. The brushes A and B will always contact similar numbers, for example, when the brush A dwells upon the position indicated by the number 1 in the upper row of numbers, the brush B similarly dwells upon the area indicated by the numeral 1 in the lower row of numbers.

The first column in the above table, change incurred, indicates a movement by the section 10 which changes the position of the brushes A and B to dwell upon a different area. These changes listed in column 1 of the above table illustrate the operation of the present invention, and will be considered in detail hereinafter. Prior to considering a number of movements of the section 10 under the brushes A and B, it must be understood that the two-state signals received by the brushes A and B are alternatively employed to detect movement by the section 10 and the direction of such movement. The determination of which signal is employed is made by a logic system hereinafter described; however, the operation of this system is such that with each occurrence of a pulse indicating an increment of motion by the member under observation, a change is made to employ the signal from the brush A or B which was not last employed. Furthermore, it is to be noted that each time the brush from which a signal is being employed crosses over a boundary separating a conductive segment 12 and a non-conductive segment 14, an output pulse will be provided indicating an increment of displacement.

Considering now the above table with reference to FIGURE 1, the brushes A and B are initially assumed to dwell upon areas 1. As indicated by the first row in the above table, the section 10 is assumed to move to the left (in a positive direction) one increment so that the brushes dwell upon areas 2. Assume initially that the brush B was being observed during the increment of movement, that is, assume that the two-state signal from brush B was being employed by the associated logic system. A consideration of FIGURE 1 indicates that as the brushes A and B pass from areas 1 to areas 2 the brush B crosses over a border between a conductive segment 12 and a non-conductive segment 14. Therefore, a pulse will be formed indicating a positive movement by the section 10. Furthermore, the occurrence of such an output pulse also indicates that the brush A should now be observed, that is, that the signal from the brush A be employed by the logic system to detect further increments of movement.

Row 2 of the above table assumes the movement of the brushes from areas 2 to areas 3. During this movement, the brush A is observed to cross a boundary and therefore another pulse will be generated indicating a positive change in position by the section 10. Row 3 of the above table assumes a movement by the section 10 whereby the brushes A and B are removed from areas 2 to dwell upon areas 3. During this movement, the brush B is observed not to cross a boundary and therefore no pulse is generated indicating a displacement. Row 4 in the table assumes a movement of the brushes A and B from areas 2 back to areas 3 during which time the brush B is again observed and again during which no border is crossed again to result in no output pulse.

In considering the above movements of the section 10 relative to the brushes A and B, it is to be noted that as the section 10 vibrated to cause the brushes A and B to move back and forth between positions 2 and 3, output pulses were not formed during each vibration. That is, an important feature of the present invention is that vibratory movement by the member under observation does not form a number of redundant signals or pulses.

Returning now to a consideration of the above table relative to FIGURE 1, row 5 in the table calls for a movement of the brushes A and B from areas 3 to areas 4 during which movement the brush B is observed. It will be noted that in moving from area 3 to area 4, the brush B crosses a boundary line between a conductive segment 12 and a non-conductive segment 14, and therefore a pulse indicating a positive change-in-position is formed. Row 6 in the table assumes a movement of the section 10 so that the brushes A and B are shifted from areas 4 back to areas 3 during which time the brush A is observed due to the production of an output pulse during the last movement. As the brush A does not cross a boundary in passing between areas 4 and 3 no output pulse is produced. However, assuming a continued negative movement (movement to the right) by the section 10 (as indicated in row 7 of the table) the movement of the brush A from area 3 to area 2 does produce an output pulse which is decoded in the logic system to indicate a negative change in position by the section 10. Similarly, a second movement of the section 10 in a negative direction is detected by the brush B as it moves from area 2 to 1 to thereby produce an output pulse indicating a negative increment of motion. Further to the above preliminary description of principles embodied in a system of the present invention, it is to be noted that the two-state signals received by the brushes A and B are decoded by a logic system to produce output pulses indicative of movement by a member carrying the section 10. These output pulses are produced, as indicated above, upon the occurrence of a change in state by the signal from the brush currently under observation. A consideration will now be made of FIGURE 2 which includes the logic system for converting the two two-state signals from the brushes A and B into digital output signals or pulses.

Figure 2:
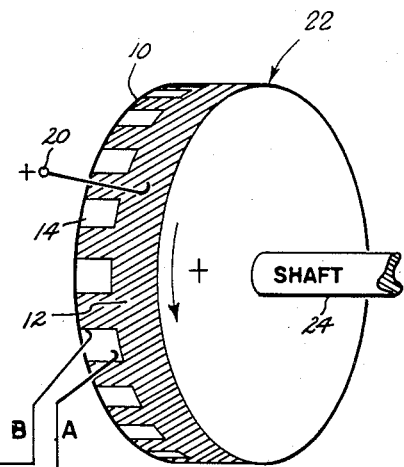
FIGURE 2 is a diagrammatic representation of a system constructed in accordance with the present invention.
Figure 2:
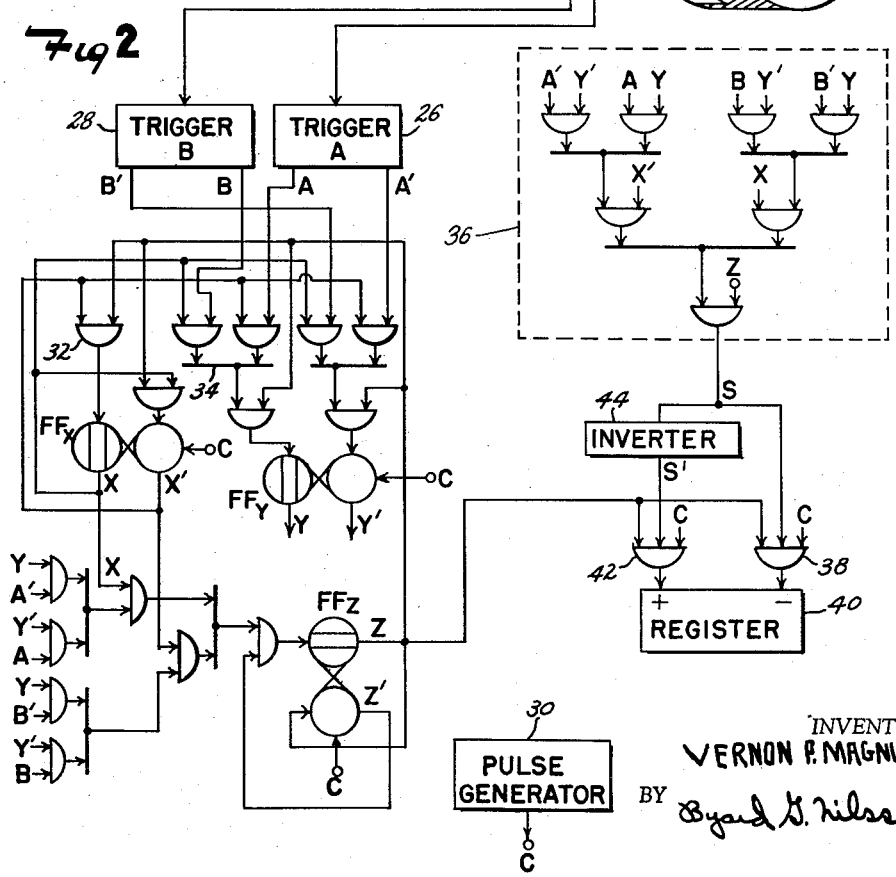

In FIGURE 2, there is shown a wheel 22 axially mounted upon a shaft 24 and carrying the segmented section 10 upon its cylindrical surface. The shaft 24, in the illustrative embodiment, represents the member whose displacement is to be digitized, or formed into a digital signal. Of course, the shaft 24 in various applications of the present invention would be connected to be moved to different positions.

The brushes A and B are connected respectively to trigger circuits 26 and 28. The trigger circuits 26 and 28 may take the form of the well-known Schmitt trigger and provide two two-state signals from the single received two-state signal. The two output signals from the triggers 26 and 28 are of opposite phase, that is, a first output signal from the trigger 28, identified as signal B coincides to the signal received from the brush B; however, the second output signal B' is the negation of the signal received from the brush B. That is, the signal B' is a two-state signal which is always in the state opposite of the two-state signal from the brush B. In a similar manner, signals A and A' are provided from the trigger circuit 26.

The signal A is a two-state signal coinciding to the signal received from the brush A; whereas, the signal A' is a two-state signal opposite to the signal received from the brush A. It is to be noted, that the convention indicated above with respect to the sigals A and B is used throughout this specification. A two-state signal may be identified by a particular letter, and the negation of this signal will be identified by the same letter carrying a prime mark, for example, A' represents a signal which is the negation of the signal represented by A.

The system shown in FIGURE 2 includes three flip-flop circuits $FF_x$, $FF_y$ and $FF_z$, which may take the form of well-known clocked bistable multivibrators. The symbol employed in FIGURE 2 to represent a flip-flop circuit has two inputs and two outputs. Two-state signals are provided from each of the outputs of a multivibrator which signals are always in opposite states. The state of these two output signals depends upon the state of the flip-flop circuit, which is in turn dependent upon which of the inputs last received a high signal in time coincidence with a clock signal applied at the clock terminal of the flip-flop circuit. Upon receiving an input signal on one of its input lines in time coincidence with a clock signal, a flip-flop circuit will alter its state to provide a high output signal upon the output line which is in alignment with the input line which received a signal. The symbol employed to represent a flip-flop circuit consists of two circles, each having an input and an output. One of the circles in the flip-flop symbol contains two parallel lines, and when the output from this circle is high, the flip-flop will be considered to be in a "one" registering state. This signal is designated by a letter coinciding to the subscript in the flip-flop designation, for example, the output from the upper portion of the flip-flop $FF_x$ is identified as $x$. Following the convention previously adopted, the other output from the flip-flop circuits are identified by the subscript of the flip-flop designation with a prime mark, for example, the other output from the flip-flop $FF_x$ is $x'$. It may therefore be seen, that each of the flip-flop circuits $FF_x$, $FF_y$, and $FF_z$, provide two output signals, one of which represents the binary number registered in the flip-flop, while the other represents the negation of the binary number registered in the flip-flop. That is, the flip-flop circuits $FF_x$, $FF_y$, and $FF_z$, respectively produce output signals $x$, $y$ and $z$ representing the value registered in the flip-flop circuits and signals $x'$, $y'$, and $z'$ representing the negation of the binary number registered in each of the flip-flop circuits.

The flip-flop circuits $FF_x$, $FF_y$, and $FF_z$, each register certain information relative to the past and present state of the shaft 24 in association with the logical network shown in FIGURE 2. The flip-flop circuit $FF_x$ registers and indicates which brush, brush A or brush B, is currently being observed. That is, the flip-flop circuit $FF_x$ indicates by its state, which signal from the brushes A and B shall be utilized by the remainder of the logical network to determine if an increment of movement has occurred since the last observation. At a time when the signal $x$ is at a high value, the signal from brush A will be utilized; however, when the signal $x$ is low and the signal $x'$ is therefore high, the signal from the brush B will be used.

The flip-flop circuit $FF_y$ registers the last position of the brush under observation. That is, the flip-flop circuit $FF_y$ registers whether the signal from the brush A or B which is being employed, was high to indicate that the brush was on a conductive segment, or low to indicate that the brush last dwelt upon a non-conductive segment. If the signal $y$ from the flip-flop circuit $FF_y$ is high, the indication is that the brush under observation when last observed was on a conductive segment 12 and therefore the signal from the brush A or B under observation was high. Conversely, if the signal $y$ is low, and the signal $y'$ is high, the indication is that during the last observation, the brush observed dwelt upon a non-conductive segment 14.

The flip-flop circuit $FF_z$ functions essentially to form an output pulse from the system, indicating that an increment of movement or displacement of the shaft 24 has occurred. Upon the occurrence of an increment as depicted by the logical system shown in FIGURE 2, the flip-flop circuit $FF_z$ will be switched to a state to provide the signal $z$ at a high value. Upon this occurrence, the signal $z$ serves to promptly switch the flip-flop $FF_z$ back to its original state to thereby form the signal $z$ into a pulse representative of the occurrence of an increment.

The changes in state, as indicated previously, by the flip-flop circuits $FF_x$, $FF_y$, and $FF_z$ may only occur at pre-determined times under the control of clock pulses from a pulse generator 30. The output C from the pulse generator 30 contains clock pulses and is connected to each of the flip-flop circuits $FF_x$, $FF_y$, and $FF_z$. In the drawing of FIGURE 1, these connections are not made but are, rather symbolically represented due to the complexity of the drawing. The function of the clock pulses from the pulse generator 30 is to time the intervals of observation of the shaft 24. The generator 30 may be an independent oscillator which runs at a frequency that is high relative to the greatest possible rate at which the shaft 24 may rotate. Or, alternatively, the generator 30 may comprise a pulse generator linked to the shaft 24 to generate pulses upon small movements of the shaft. The signals from the generator 30 may thus command observations of the shaft position at proper intervals. That is, these signals function to "sample" or check the position of the shaft 24 at regular intervals by enabling the logical network in the system to determine whether or not the shaft 24 has moved through an increment of motion. The interconnection of the trigger circuits 26 and 28 and the flip-flop circuits $FF_x$, $FF_y$ and $FF_z$ is made through a plurality of "and" gates indicated by a symbol 32 and a plurality of "or" gates, as indicated by a symbol 34. These gate circuits operate upon the signals from the flip-flop circuits and trigger circuits to perform certain logical operations resulting in the determination of whether or not the flip-flop circuit $FF_z$ should or should not be changed in state to indicate an increment of displacement by the shaft 24. Electrical circuits satisfactory for use as the "and" gate circuits and "or" gate circuits employed in the system of FIGURE 2 are shown and described in a book entitled "Arithmetic Operations in Digital Computers" by R. K. Richards.

The above-identified book furthermore discloses the manner of interconnecting "and" gates and "or" gates in accordance with certain logical equations, and furthermore teaches the conventional mode of manipulating logical equations. A recitation of each of the gate circuits in the system of FIGURE 2 and their mode of connection does not further a teaching of the present invention nor the operation of the system; therefore, the equations indicative of the manner in which the logic system of FIGURE 2 is connected will be considered in explaining the operation of the system. The logic equations of the system of FIGURE 2 are set out below:

$$x = zx'$$
$$x' = zx$$
$$y = z(xB + x'A)$$
$$y' = z(xB' + x'A')$$
$$z = z'[x(yA' + y'A) + x'(yB' + y'B)]$$
$$z' = z$$

The clocking signals from the pulse generator 30 have been omitted from the above equations, due to the fact that the formation of each of the signals in the above equation is conditioned upon the presence of a clock pulse. Therefore, these signals indicated by the capital letter "C" are assumed to be present as a multiplier in each of the above equations.

To consider the above equations in detail, consider first the formation of the signal $x$. The signal $x$ is formed at a high value upon each occurrence of an output pulse $z$ at a time when $x$ was previously at a low value, as indicated by $x'$ being high. In a similar fashion, the signal $x'$ is formed high upon each occurrence of an output pulse indicated by the signal $z$ being high in coincidence with the signal $x$ being high. It may therefore be seen, that the flip-flop circuit $FF_x$ changes its state upon each occurrence of an output pulse. This is in accordance with the assumption made in discussing the schematic illustration of FIGURE 1, that the brush observed of the brushes A and B changes each time an output pulse is produced. That is, it was previously assumed that each time the brush A or B under observation crossed a boundary between a conductive segment 12 and a non-conductive segment 14, an output pulse was produced, and furthermore, the other brush was then observed. In view of the fact that the flip-flop circuit $FF_x$ determines which brush shall be observed, i.e. the signal from the brushes A and B which is utilized by the logical network, and because this flip-flop circuit changes state each time an output pulse is produced it may be seen that the signals A and B, representative of the position of the two brushes A and B are alternately used by the logic network, the change occurring after each output pulse when the signal $z$ goes high. In cooperation with the signals from the flip-flop circuit $FF_x$, the flip-flop circuit $FF_y$ functions to determine the last position of the brush under consideration, and the flip-flop circuit $FF_z$ with associated gate circuitry determines whether a boundary has been crossed since the last occurrence of a pulse from pulse generator 30. The other logic equations set out above will now be individually considered to indicate the manner in which each of the flip-flop circuits function.

Considering the third equation set out above $$y = z(xB - x'A)$$

this equation indicates that the signal $y$ will be high (indicating that the signal from the brush under observation was high during the last sampling interval, or that the brush under observation dwelt upon a conductive segment 12) at a time when there is an output pulse $z$, and the signal from brush A is being observed, and further that the signal from the brush B goes low. The signal $y$ will also be formed high at a time when the $z$ pulse occurs, and the signal from the brush B is being used, and the signal from the brush A goes to a low value. A consideration of these possibilities in conjunction with FIGURE 1 will indicate that during these circumstances the brush A or B which is next to be observed has moved on to a conductive segment 12.

The fourth equation set out above, $y' = z(xB' + x'A')$, indicates the time when the signal $y'$ will be high, indicating that the brush under observation was upon a non-conductive segment 14 when last observed. The signal $y'$ will go to a high value with the occurrence of a $z$ pulse in the output signal, and at a time when the A brush is under observation and the signal from the B brush goes high or alternatively when the B brush is under observation, and the signal from the A brush goes high. Again a consideration of these possiblities with respect to the diagram of FIGURE 1 indicates that under these circumstances, the brush next to be observed has now moved on to a non-conductive segment 14.

Considering now the formation of the pulse $z$, i.e. the interval during which the signal $z$ is at a high level, according to the equation $$z = z'[x(yA' + y'A) + x'(yB' + y'B)]$$

The signal $z$ is formed high, to thereby form the $z$ pulse, at a time when no $z$ pulses are being formed, as indicated by the term $z'$ in the equation. Additionally, the formation of the signal $z$ at a high level requires that: if the brush A is under observation, and the brush A was last on a conductive segment 12 and has now moved on to a non-conductive segment 14, or alternatively, that the brush A, when last observed was on a non-conductive segment 14 and has now moved to a conductive segment 12. If the brush B is under observation then the output signal $z$ forms a pulse if the B brush was last upon a conductive segment 12 and has now moved to a non-conductive segment 14, or alternatively was last on a non-conductive segment 14 and has now moved to a conductive segment 12. A consideration of the above indicates that a pulse is formed in the signal $z$ at a time when the brush under observation crosses a boundary between a conductive and a non-conductive segment. Of course, this mode of operation is in accordance with the assumed operation outlined in the preliminary discussion with respect to FIGURE 1.

In addition to detecting that an increment of motion or displacement by the shaft 24 has occurred the present system also functions to determine the direction of rotation by the shaft 24. The segmented section 10 placed on the cylindrical portion of the wheel 22 is arranged as shown in FIGURE 1 so that the rotation of the shaft 20 in one direction is designated as positive whereas rotation in the other direction is designated as negative. The sign of the direction of rotation of the shaft 24 is detected by the sign-detecting logic network 36, FIGURE 2. At a time when the two-state signal S emerging from the network 36 is a high value, a negative increment will be indicated. This sign signal S in conjunction with the signal $z$ is decoded to indicate the total displacement of the shaft 24. The sign signal S is applied to a gate circuit 38 with a clock signal and the $z$ signal. At a time when the gate circuit 38 is qualified and passes a high output signal, a signal will be applied to a register 40 indicating a decrement or negative increment of movement by the shaft 24. The signal S is also applied to a gate 42 through an inverter circuit 44. The inverter circuit 44 functions to form the negation of the signal S, i.e. S'. Inverter circuits as the inverter 44 are generally well-known in the computer art and an exemplary form of this circuit is shown and described in the above-referenced book. Along with the signal S', the gate circuit 42 also receives the $z$ signal and the clock signal. The gate circuit 42 is qualified at a time when an increment occurs, and the signal S is low, indicating that the increment of motion by the shaft 24 is positive. These positive and negative indications from the gate circuits 38 and 42, are applied to the register 40 which indicates the accumulated or total displacement of the shaft 24 from some reference position. A register satisfactory for use as the register 40 is shown and described in United States Patent 2,735,005 to F. G. Steele entitled Add-Subtract Counter.

The formation of the signal S, indicating the sign of the last increment, will now be considered. This signal is formed in accordance with an equation $$S = z[x(yB' + y'B) + x'(yA + y'A')]$$

The foregoing equation indicates that the signal S will be formed at a high value (indicating a negative increment) at a time when: (1) there is an increment and (2) the brush A is under observation, and this brush was on a conductive segment and the brush B has now moved to a non-conductive segment, or alternatively, that the brush A was on a non-conductive segment, and the brush B has now moved on to a conductive segment. Furthermore, the signal S will be formed high at a time when: (1) the signal $z$ is high, and (2) the brush B is under observation, this brush was on a conductive segment, and the brush A has now moved on to a conductive segment or alternatively, that the brush B was on a non-conductive segment, and is still on a non-conductive segment. A consideration of the schematic diagram of FIGURE 1 in conjunction with the various situations outlined above will indicate that these conditioned changes coincide to negative movement of the segmented section 10.

It is to be noted, that the sign-detecting logic network 36 in FIGURE 2 is not shown to be connected to receive the various signals in the system. Rather these connections are coded by indicating the letters identifying the certain signals adjacent lines in the network 36 to which they are to be connected.

Considering an exemplary operation of the system of FIG. 2, similar to those previously employed with reference to FIG. 1, the brushes A and B are shown to both dwell on a non-conductive segment. It may be assumed at this time that the brush B is under observation as indicated by the signal $x'$ being high, i.e. $FF_x$ is reset. If the shaft 24 now revolves in a positive direction, the brush B passes on to a conductive segment 12, and the trigger circuit B is activated to provide a high level for the signal B. At this instant, the signal Y' is high indicating that the brush B previously engaged a non-conductive segment 14. Therefore, both the signals Y' and B are high, to qualify the Y'B "and" gate input to the flip-flop $FF_z$. The output from that gate is passed to the flip-flop because $x'$ is high and an output pulse Z is provided.

Upon the occurrence of the output pulse Z, the gate 32 is qualified by the pulse Z and signal $x'$ to set the flip-flop $FF_x$ so that the signal $x$ is high. As a result, the brush A is now indicated to be under observation.

The pulse Z also resets the flip-flop $FF_z$, terminating the pulse. This flip-flop remains reset because the signal $x'$ is now low.

The pulse Z is also employed in the sign-detecting network 36. However, although the gate BY' is qualified, the following gate is inhibited because X is still at a low value. Therefore, the signal S is low with the result that S' is high from the inverter 44 and the positive gate 42 is qualified to pass the pulse Z to the register 40 which increments its contents.

This example illustrates an operation of the system of as described with reference to FIG. 1, and other operations described relative to FIG. 1 may be seen to be similarly accomplished.

Figure 3:
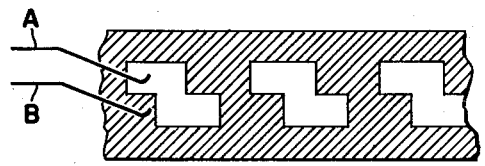
FIGURE 3 is a fragmentary view of a portion of the system of FIGURE 2 illustrating an alternative mode of construction.

In the practice of the present invention, it is to be understood that various forms of apparatus may be affixed upon the shaft 24 to form two two-state signals, which are displaced from each other by essentially one-half the width of a segment in the segmented section 10. In effect, these two signals are essentially one-quarter of a cycle out of phase with each other. One alternative apparatus for forming the two two-state signals is shown in FIGURE 3. FIGURE 3 shows an alternative arrangement for forming the segmented section which is placed upon the cylindrical surface of the wheel 22. In FIGURE 3 the brushes A and B are mounted in alignment, while the segmented sections in each of the tracks traversed by the brushes A and B are offset from each other. That is, the non-conductive areas or segments in the embodiment of FIGURE 3 are staggered so that the two two-state signals will be shifted relative to each other.

An important feature of the present invention is to provide a system for digitizing the displacement of a member wherein the digital signals formed indicate not only that an increment or decrement of displacement has occurred, but further indicates the direction of such displacement. A further important feature of the present invention resides in the fact that the displacement of a member is digitized, while dithering, or vibrating motion by the shaft or other member does not produce a number of redundant signals which in effect indicate only a vibrating movement.

It should be noted that although the particular embodiment of the invention herein shown and described is fully capable of providing certain advantages, such embodiment is merely illustrative of this invention and therefore modifications and changes may be made thereto without departing from the spirit of the invention or the scope of the following claims.

I claim:

1. Apparatus for digitizing the displacement of a mechanical member, comprising: segmented means affixed to said mechanical member to provide two-state signals according to the position of said member; first and second means for sensing said segmented means to provide said two-state signals as phase-displaced electrical signals; a first register for designating one of said phase-displaced electrical signals as the current signal; a second register for indicating the last prior state of said current signal by a prior state signal; an output signal generator for receiving said current signal to provide an output signal indicative of a predetermined movement by said member upon the occurrence of such movement; means for receiving said output signal, said phase-displaced signals and a signal from said first register to control said first and second registers and alter the state of said first register upon each output signal; and means to accumulate said output signals to manifest the displacement of said member.

2. Apparatus for digitizing the displacement of a mechanical member, comprising: means coupled to said mechanical member for providing a first two-state signal and a second two-state signal, each of which changes state with incremental movement of said mechanical member, said first and second two-state signals being phase displaced; a first register means for designating one of said first and said second two-state signals as the current signal to indicate movement of said mechanical member; a second register means for registering the last prior state of said current signal; an output signal generator for receiving said current signal to provide an output signal indicative of a predetermined movement by said member upon the occurrence of such movement; and means to alter said first register upon the occurrence of each output signal to designate the other of said two-state signals as the current signal.

3. Apparatus for digitizing the displacement of a mechanical member, comprising: means coupled to said mechanical member for providing a first two-state signal and a second two-state signal, each of which changes state with incremental movement of said mechanical member, said first and second two-state signals being phase displaced; a first register for designating one of said phase-displaced electrical signals as the current signal; a second register for indicating the last prior state of said current signal by a prior state signal; an output signal generator for receiving said current signal to provide an output signal indicative of a predetermined movement by said member upon the occurrence of such movement; means for receiving said output signal, said phase-displaced signals and a signal from said first register to control said first and second registers and alter the state of said first register upon each output signal; and means coupled to receive said phase-displaced first and second two-state signals, signals from said first and second registers and said output signal to form a sense signal indicative of the direction of movement by said mechanical member.

4. Apparatus according to claim 4 further comprising means connected to receive said output signals and said sense signals and including a register to manifest the current position of said mechanical member according to received signals.

5. Apparatus according to claim 4 wherein said first and said second two-state signals are substantially 180 degrees out of phase.

References Cited in the file of this patent

UNITED STATES PATENTS

| | | |
|---|---|---|
| 2,685,082 | Beman et al. | July 27, 1954 |
| 2,733,430 | Steele | Jan. 31, 1956 |
| 2,873,441 | Miller | Feb. 10, 1959 |